(No Model.) 3 Sheets—Sheet 1.
R. T. BÉNÉ.
METHOD OF MAKING FEATHER BOAS.
No. 392,095. Patented Oct. 30, 1888.
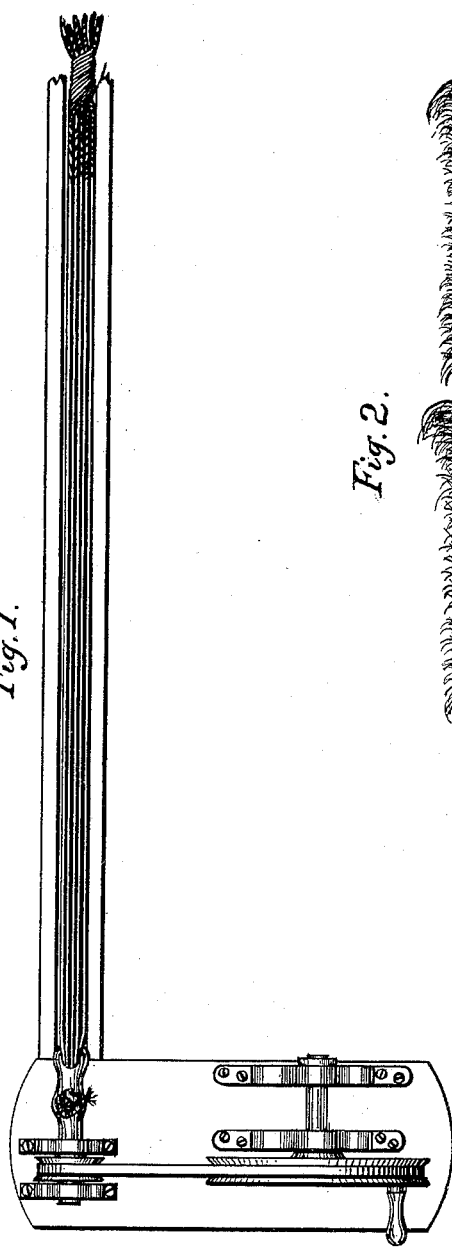
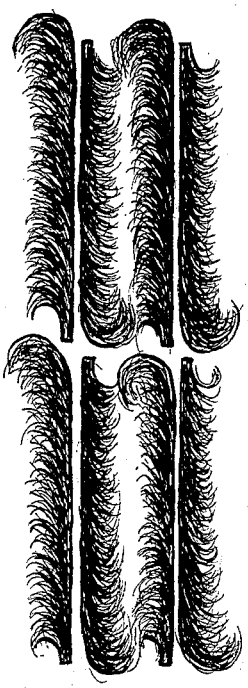
Witnesses:
D. F. Haywood.
B. B. Dolaro.
Inventor:
Réhiel Thomas Béné.
Per Leonard B. Sutro.
Attorney.

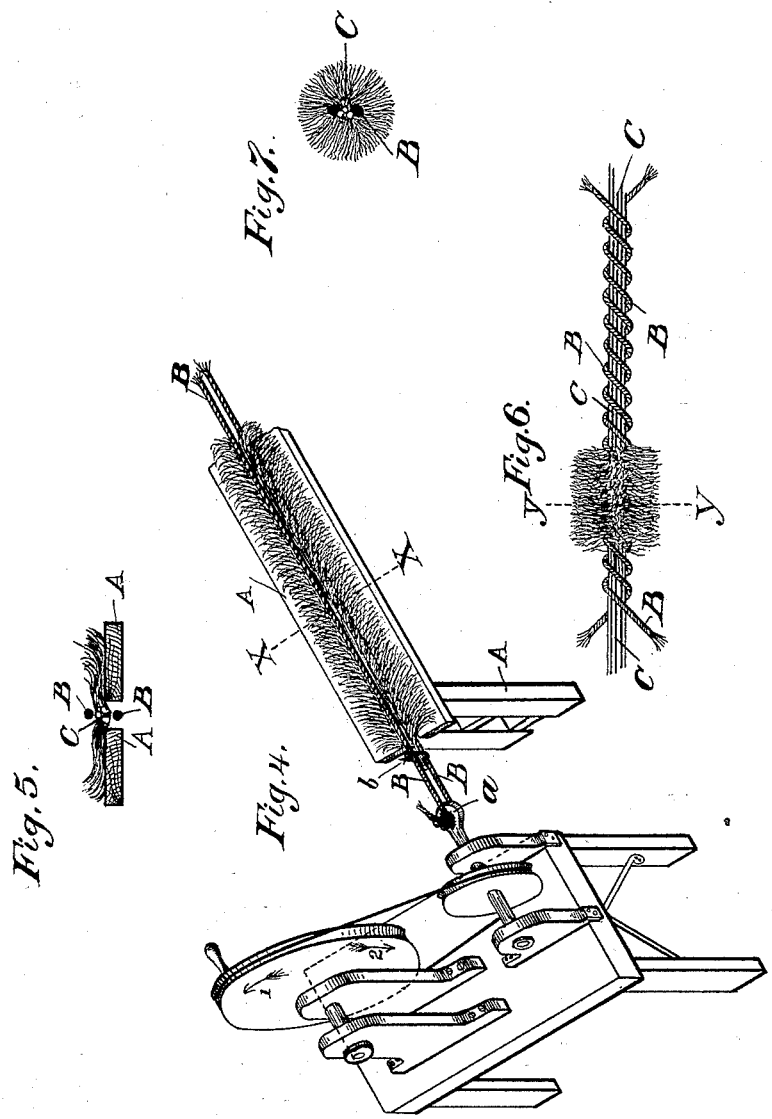

(No Model.) 3 Sheets—Sheet 3.

R. T. BÉNÉ.
METHOD OF MAKING FEATHER BOAS.

No. 392,095. Patented Oct. 30, 1888.

Witnesses:—
D. F. Haywood,
J. Felbel.

Inventor:
Réhül T. Béné,
Per Leonard B. Sutro,
his Attorney.

UNITED STATES PATENT OFFICE.

RÉHÜL T. BÉNÉ, OF HOBOKEN, NEW JERSEY, ASSIGNOR TO J. KAUFMANN & CO., OF NEW YORK, N. Y.

METHOD OF MAKING FEATHER BOAS.

SPECIFICATION forming part of Letters Patent No. 392,095, dated October 30, 1888.

Application filed July 28, 1888. Serial No. 281,348. (No model.)

*To all whom it may concern:*

Be it known that I, RÉHÜL THOMAS BÉNÉ, a citizen of the United States, and a resident of Hoboken, in the county of Hudson and State of New Jersey, have invented certain new and useful Improvements in the Manufacture of Feather Boas, of which the following is a specification; and I do hereby declare that the following is a full, clear, and exact description of the invention, which will enable others skilled in the art to which it appertains to make and use the same, reference being also had to the accompanying drawings.

Heretofore boas made of feathers were held together by wires wound around their central axes or quill portion, and the rounding of the boa was done by hand; but the objection to wire is that it is not pliable enough and does not of itself round up the boa, as my improved manner of making the boa does.

The object of my invention is to make the boa very pliable, round the boa thoroughly and quickly by the action of twisted cords, cheapen the goods, and prevent untwisting.

Figure 8:
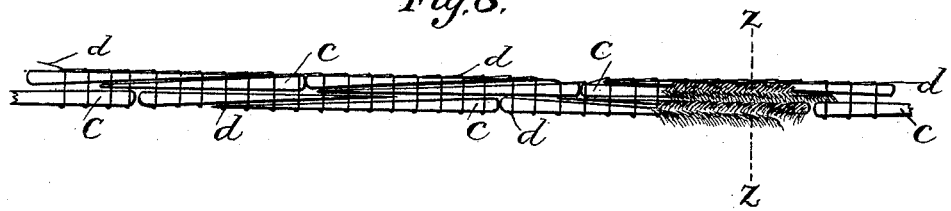
Figure 9:
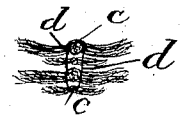
Figure 10:
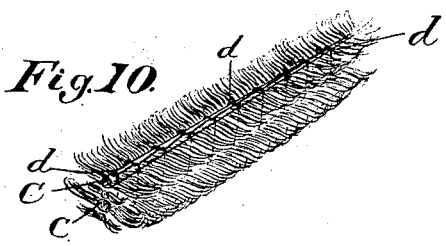
Figure 11:
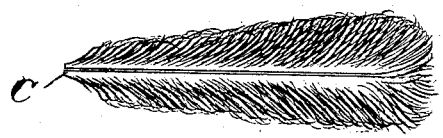

In the drawings forming part hereof, Figure 1 is a plan view showing the spinning-wheel twisting the strands into one cord. Fig. 2 simply shows the laying of the feathers alternately in opposite directions, the thin end of each alternate quill over the thicker end of the one below it; but the ultimate positions of the feathers is, however, shown in Fig. 8. Fig. 3 shows the cord made up of twisted strands doubled over, and its upper and lower parts twisted around each other, as hereinafter more fully explained. Fig. 4 is a perspective view of the spinning-wheel and slotted table, and showing the feathered fabric in position between the upper and lower parts of the doubled-over cord. Fig. 5 is a cross-section through X X of Fig. 4. Fig. 6 is a general view of the doubled-over cord twisted around the quill portion of the boa, the flue for the most part being torn away. Fig. 7 is a cross-section through line *y y* of Fig. 6. Fig. 8 is a general view of the manner in which the feathers are laid relatively to each other and sewed to make the feathered fabric ready to be laid between the upper and lower parts of the doubled-over cord, the flue of the feathers for the most part being torn away. Fig. 9 is a cross-section through Z Z of Fig. 8. Fig. 10 is a perspective view showing the feathered fabric as it is sewed together and ready to be laid between the upper and lower parts of the doubled-over cord. Fig. 11 shows a feather split up the center ready for use.

Before using any of the feathers I split the quills, as shown in Fig. 11. This makes them more pliable. I take the feathers and make a feathered fabric thereof, arranging them in about the manner shown in Fig. 8—that is to say, I place the thicker end of the quills somewhat over the thinner ends of the quills below, the object being to make the feathered fabric of about an even thickness along its length, and to make the fabric compact I generally use about six layers of feathers. I sew a thread, *d*, along the feathered fabric, about as shown in Fig. 8. I overlap the feathers, as shown in said Fig. 8, which serves to assist in supporting the different parts of the feathered fabric and in keeping them together when sewed, as mentioned, and also serves to make such fabric more compact. I now have a feathered fabric sewed up. Of course the feathered fabric while being now a long fabric of feathers has not yet the round shape of a boa, nor could it stand the wear of a boa.

I will now describe how I make the doubled-over cord.

I take about six strands of cotton cord, and knotting them together at one end place such knotted end into a spinning-wheel. (See Fig. 1.) I also knot the other end of the strands together, which other knotted end is held so that the strands are kept fairly taut. Then I turn the spinning-wheel in the direction of the arrow marked 2. (See Fig. 4.) This twists the strands thoroughly and makes a twisted cord. This twisted cord is indicated in Fig. 1, but cut off at one end. Then the other knotted end of this twisted cord, which was not yet in the spinning-wheel, is now brought around, (keeping the cord taut while bringing it around, so as to prevent unraveling,) and this other knotted end is also placed in the spindle *a* of the spinning-wheel, (see Fig. 4,) so that I now have both ends of the twisted cord B in the spinning-wheel, and I have this twisted cord doubled over. The long-feathered fabric is now placed between the upper and lower parts of this doubled-over cord, (see Figs. 4 and 5,) the quill portion C being in about the center of the slotted table A. (See Figs. 4 and 5.) I now tie the quill portion C of the feathered fabric at both ends tightly to the contiguous parts of the upper and lower cords, (see one end of the quill portion tied at *b*, Fig. 4,) so as to keep the cords from unraveling and to hold the central axis or quill portion of the feathered fabric taut all along its length between the two parts—that is, between the upper and lower parts—of the cord. I now comb away the flue from the quill portion on either side, so that the quill portion C remains exposed, and nothing intervenes between it and the cord on either side of it. This is best seen in Fig. 5. Having placed the feathered fabric in between the upper and lower parts of the cord, as in Fig. 4, and tied the quill portion of the feathered fabric at both ends to the contiguous parts of the cord, as stated, and combed the flue as above, I now turn the spinning-wheel in the direction of the arrow 1, (see Fig. 4,) which is the opposite direction from that in which I turned it to twist the strands. This second twisting (as the two knots of the doubled-over cord are in the spindle *a*, and the feathered fabric is held along its central axis or quill portion between the upper and lower cord) twists the parts of the cord (the upper and lower parts) and the quill portion C into each other—that is to say, the quill portion C of the feathered fabric is caught, held, and twisted between the upper and lower cords, as seen in Fig. 6. This second twisting, by the friction of the two parts of the cord against the quill portion C, rounds up the boa, as best seen in Fig. 7, the twisting of the two parts of the cord necessarily squeezing against the quill portion while they (the two parts) are twisting into each other and into the quill portion—that is to say, the friction against the quill portion occasioned by the two parts of the cord twisting into each other rounds the boa. I now steam the boa along its length and let the steam soak into the quill portion and cord. This unites the twisted cord and quill portion more thoroughly still and retains the twist of them better yet, and also softens and makes more pliable the quill portion itself. I now sew a few stitches through the twisted cord and quill portion just at either end of the boa thoroughly, so that it cannot unravel.

Of course more or less number of layers of feathers can be used instead of six, and more or less number of strands of cord; but I have only shown what I prefer, so as to show my process as I prefer to use it.

Fig. 3 also shows how the two parts of the cord twist into each other, and also shows that they are doubled over each other and twisted into each other, but does not show how they catch the quill portion between them. (This is shown in Fig. 6.) The two parts of the cord would, in fact, twist into each other naturally without the spinning-wheel the moment they are doubled over each other, but not sufficiently tight for my purpose. I prefer, therefore, to keep them from twisting together of their own accord by holding them apart till the action of the wheel twists them. The reason they would naturally twist together is that the original twist of the strands makes the two parts of the cord tend to twist around each other, and the two parts doubled over would so twist around each other unless prevented by being held apart. While these two parts are twisting into each other they pick up and revolve the feathered fabric, and at the same time it is rounded by the friction of the upper and lower cord against the quill portion, so that the flue of the feathered fabric thereby assumes the round shape of the boa, as hereinbefore stated, and the two parts of the cord twist and hold the quill portion of the boa between them all along its length, all as hereinbefore described.

I prefer to take strands of cord about two and two-thirds times the length of the desired boa, because the cord is to be doubled over, as shown, and the double twisting of it shortens the cord, so I need it longer than merely double the length of the boa. For a three-yard boa, therefore, I would take strands about eight yards long. I prefer six strands. When I twist these six strands together for such an eight-yard length of cord, I twist them together about ten thousand times, which can be done in about a minute, turning a spinning-wheel of about two feet diameter rather leisurely, say a revolution each second. This amount of twisting is about what is necessary for my purpose to give a thorough twist, considering the eight-yard length of strands. After such an eight-yard twisted cord is doubled over, and when I twist its upper and lower parts into each other by turning the wheel in the contrary direction, as explained, I twist the upper and lower parts of the cord into each other about fifteen hundred times. Making the strands two and two-thirds times the length of the desired boa generally leaves enough cord at either end, (even when doubled over and the second time twisted,) so that the boa can be held easily thereby while being steamed, say about three or four inches of cord at either end. After steaming this superfluous cord is cut off.

Care should be taken during the operation to keep the cord always taut till it has received the second twisting—that is, till the upper and lower parts of the doubled-over cord and the quill portion are intertwisted, so that it does not unravel nor curl up, but is kept straight. Of course a shorter cord could be twisted thoroughly along its length by a less number of revolutions; but the proportions I have given are for a three-yard boa—eight-yard strands of cord—and any skilled mechanic can use these proportions as a guide when the cord is shorter.

More or less number of strands of cord can be used, and more or less number of layers of feathers, instead of six. I have used four layers myself; but the best boas usually have six layers of feathers.

Having described my invention, so that others skilled in the art are enabled to make and use the same, what I claim is—

1. The hereinbefore-described process for producing boas of feathers by producing a feathered fabric by placing the thicker ends of the quills of the feathers over the thinner ends of the quills below and overlapping the feathers and then sewing up the feathered fabric, then producing a cord by twisting a number of strands around each other, then operating on such fabric by doubling the cord over it and holding the fabric between the upper and lower parts of the cord along the central axis or quill portion of the fabric, and then twisting the upper and lower parts of the cord around each other and around the quill portion, all substantially in the manner described and shown.

2. The hereinbefore-described process for producing boas of feathers by producing a feathered fabric by placing the thicker ends of the quills of the feathers over the thinner ends of the quills below and overlapping the feathers and then sewing up the feathered fabric, then producing a cord by twisting a number of strands around each other, then operating on such fabric by doubling the cord over it and holding the fabric between the upper and lower parts of the cord along the central axis or quill portion of the fabric, then twisting the upper and lower parts of the cord around each other and around the quill portion, and then steaming the cord and quill portion, all substantially in the manner set forth.

Signed at New York city, in the county of New York and State of New York, this 27th day of July, A. D. 1888.

RÉHÜL T. BÉNÉ.

Witnesses:
CHARLES T. MARVIN,
JAMES R. HENRY.